United States Patent [19]

Donald

[11] 3,948,895

[45] *Apr. 6, 1976

[54] SYNTHESIS OF 3,5-DIAMINOPYRAZINOIC ACID FROM 3,5-DIAMINO-2,6-DICYANOPYRAZINE AND INTERMEDIATES

[75] Inventor: Dennis S. Donald, Wilmington, Del.

[73] Assignee: E. I. Du Pont de Nemours and Company, Wilmington, Del.

[ * ] Notice: The portion of the term of this patent subsequent to Nov. 6, 1992, has been disclaimed.

[22] Filed: Mar. 6, 1972

[21] Appl. No.: 232,206

Related U.S. Application Data

[63] Continuation-in-part of Ser. No. 184,578, Sept. 28, 1971, abandoned.

[52] U.S. Cl. ............................................ 260/250 BN
[51] Int. Cl.[2] ........................................ C07D 241/46
[58] Field of Search .................. 260/250 R, 250 BN

[56] References Cited
UNITED STATES PATENTS

| | | | |
|---|---|---|---|
| 3,017,412 | 1/1962 | Daglish | 260/250 R |
| 3,313,813 | 4/1967 | Cragoe | 260/250 R |
| 3,345,372 | 10/1967 | Hanifin | 260/250 R |
| 3,544,568 | 12/1970 | Cragoe | 260/250 R X |
| 3,814,757 | 6/1974 | Donald | 260/250 R |

FOREIGN PATENTS OR APPLICATIONS

| | | | |
|---|---|---|---|
| 2,216,925 | 10/1972 | Germany | 260/250 R |

*Primary Examiner*—Richard J. Gallagher
*Assistant Examiner*—D. B. Springer
*Attorney, Agent, or Firm*—Anthony P. Mentis

[57] ABSTRACT

An improved method for the preparation of 3,5-diaminopyrazinoic acid (which is useful for the manufacture of diuretics) is described. New compounds obtained in the process include 3,5-diamino-2,6-dicarbamoylpyrazine; 3.5-diamino-6-carbamoylpyrazinoic acid and 3,5-diamino-6-carbamoylpyrazine. The latter compounds are also useful as curing agents for epoxy resins.

3 Claims, No Drawings

SYNTHESIS OF 3,5-DIAMINOPYRAZINOIC ACID FROM 3,5-DIAMINO-2,6-DICYANOPYRAZINE AND INTERMEDIATES

RELATED APPLICATION

This application is a c-i-p of my copending application Ser. No. 184,578, filed Sept. 28, 1971, now abandoned.

BACKGROUND OF THE INVENTION

1. Field of the Invention

This invention relates to novel diaminopyrazines having at least one carbamyl group and to their preparation. The compounds are useful as curing agents for epoxy resins and as intermediates for diuretics.

2. Description of the Prior Art

Numerous nitrogen containing heterocyclic compounds have importance in pharmaceutical applications. Pyrazines have considerable potential in such applications as well as for the preparation or modification of polymers. In U.S. Pat. Nos. 3,274,192; 3,300,494; 3,305,552; and 3,313,813 methods are described for the preparation of amino pyrazines having a guanidyl group attached to nuclear carbamoyl. Considerable effort has been expended to obtain these compounds and long and devious synthetic routes have been shown in the above patents.

A facile route to intermediates of use for preparing the pharmaceutically useful compounds as well as supplying novel and otherwise useful compositions would increase the potential applications for pyrazine derivatives.

DESCRIPTION OF THE INVENTION

The novel compounds of this invention have the formula

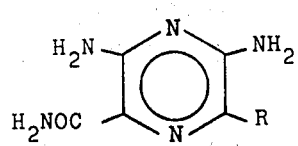

wherein R is —COOH, $CONH_2$ or H. These have been obtained by (a) selective hydrolysis of 3,5-diamino-2,6-dicyanopyrazine and (b) decarboxylation by heat to convert carboxy to hydrogen. In essence, 3,5-diamino-2,6-dicyanopyrazine is hydrolyzed to convert the two cyano groups to carbamoyl groups, one of which is hydrolyzed and decarboxylated to hydrogen and the other is further hydrolyzed to carboxy, the end product being 3,5-diaminopyrazinoic acid. This compound is useful in producing known diuretic intermediates such as methyl 3,5-diaminopyrazinoate and methyl 6-chloro-3,5-diaminopyrazinoate.

The hydrolysis of the starting material, 3,5-diamino-2,6-dicyanopyrazine, can be accomplished by a number of ways, all with the common goal of converting the two cyano groups to carbamoyl groups. Depending upon the reaction conditions and the compound desired, further hydrolysis results in a conversion of one or both of the said carbamoyl groups to carboxy. The carboxy substituent in turn can be converted to a hydrogen substituent.

The hydrolysis can be carried out with hydrolytic agents and under hydrolytic conditions known to the art. Usually the hydrolysis is accomplished in aqueous medium. When basic conditions are used, the hydrolysis can be carried out with substances such as alkali metal hydroxides or alkali metal carbonates, as for example sodium hydroxide, potassium hydroxide, lithium hydroxide, sodium carbonate, potassium carbonate and the like. When acidic conditions are used strong mineral acids such as sulfuric, phosphoric and halogen acids may be used. When concentrated sulfuric acid is used neat, the hydrolysis product is the dicarbamoyl compound.

Concentration of the reactant and hydrolysis agent, and the time, temperature and pressure at which the reaction is carried out, are not critical. In general, one should use the concentrations, temperature, time and pressure which will give the most efficient hydrolysis and these conditions are very readily determined. Isolation of the desired product may also be accomplished by any well known method, as for example, precipitation, crystallization, salting out and the like.

Decarboxylation of a carboxy group to hydrogen likewise can be carried out by any method known to the art for decarboxylating compounds having a carboxy group on a pyrazine nucleus. For example heat alone, or the use of a heat with the compound dissolved or suspended in an inert solvent, or the use of heat under acid catalysis conditions may be used, due care being taken not to hydrolyze the amino groups present.

SPECIFIC EMBODIMENTS OF THE INVENTION

The following are illustrative examples of the invention in which all parts are by weight unless stated otherwise.

EXAMPLE 1

Preparation of 3,5-diamino-6-carbamoylpyrazinoic Acid and 3,5-diamino-2,6-dicarbamoylpyrazine

R = $CONH_2$ AND COOH

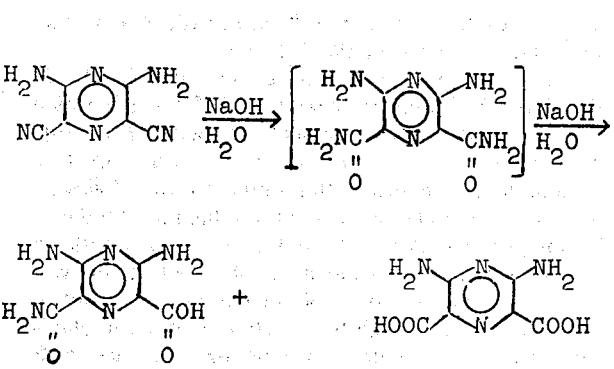

To a well stirred, refluxing slurry of 7.50 g (46.9 mmol) of 3,5-diamino-2,6-dicyanopyrazine in 80 ml of water was added in one portion a solution of 4.00 g (100 mmol) of sodium hydroxide in 20 ml of water. The slurry became very thick within 10 minutes. The 3,5-diamino-2,6-dicyanopyrazine is hydrolyzed to 3,5-diamino-2,6-dicarbamoylpyrazine at this point as shown by removal of a small sample, collection of the solid by filtration and comparison of the infrared spectrum of the dried material with that of the compound prepared by another method (see below). Further heating at reflux for 20 hours resulted in complete solution. The solution was cooled in an ice bath and carefully acidified with concentrated hydrochloric acid. The precipitated solid was collected by filtration and washed with water. After drying there was obtained 8.70 g of an approximately 2:1 mixture of 3,5-diamino-6-carbamoylpyrazinoic acid and 3,5-diamino-2,6-pyrazine dicarboxylic acid respectively (as indicated by the infrared spectrum and elemental analysis). This mixture was utilized without further fractionation in the subsequent decarboxylation step (see Example 3).

Prolonged reflux results in complete hydrolysis to 3,5-diamino-2,6-dicarboxypyrazine as illustrated later.

EXAMPLE 2

Preparation of 3,5-diamino-6-carbamoylpyrazinoic acid

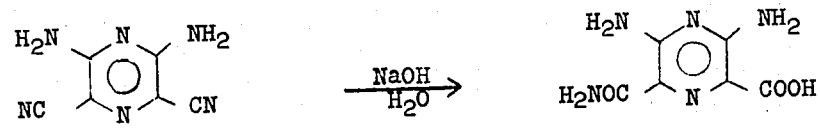

3,5-Diamino-6-carbamoylpyrazinoic acid free of 3,5-diamino-2,6-pyrazine dicarboxylic acid is directly obtainable from the alkaline hydrolysis of 3,5-diamino-2,6-dicyanopyrazine or the corresponding diamide by simple variations in reagent concentrations and reaction times as shown by the following:

A slurry consisting of 7.00 g (43.8 mmol) of 3,5-diamino-2,6-dicyanopyrazine in 1.2 l of water in which was dissolved 3.50 g (97.6 mol) of sodium hydroxide was heated rapidly to reflux. The reaction mixture became homogeneous within 3 min at reflux, followed in 1 min by the precipitation of 3,5-diamino-2,6-dicarbamoylpyrazine. After a total of 3 hr 10 min at reflux a homogeneous solution was again obtained. Reflux was continued for an additional 40 min as a stream of nitrogen was passed through the reaction medium to eliminate any residual ammonia. Cooling in an ice bath resulted in the precipitation of 3.30 g (16.9 mmol) of 3,5-diamino-2,6-dicarbamoylpyrazine which was collected by filtration and oven dried. Acidification of the filtrate to pH 3 with hydrochloric acid gave 5.00 g (24.4 mmol) of 3,5-diamino-6-carbamoylpyrazinoic acid after collection by filtration and oven drying. This represents a 61% conversion and 94% yield of the amide acid.

Increasing the time at reflux to 6 hr 30 min resulted in an 80% conversion and a 94% yield of the amide acid.

After 18 hr 30 minutes at reflux complete conversion was obtained with a yield of 87.2% of the amide acid essentially free of the diacid.

A 4.0 g sample of 3,5-diamino-6-carbamoylpyrazinoic acid was recrystallized from a mixture of 75 ml dimethyl formamide and 60 ml of water giving 3.0 g of crystalline material which melts at 300° with decomposition and gas evolution.

IR (KBr): $2.90\mu$, $3.01\mu$, $6.07\mu$ (—$NH_2$); $3.5$–$4\mu$ (weak absorption for acid -OH); $5.85\mu$ (acid >C=O); $5.99\mu$ (amide >C=O); $6.32\mu$, $6.55\mu$ (conjugated cyclic —C=C— and/or —C=N—).

UV $\lambda_{max}^{EtOH}$: 356 m$\mu$ ($\epsilon$ = 17,900); 279 m$\mu$ ($\epsilon$ = 19,700); (224 m$\mu$ ($\epsilon$ = 31,500)

HRMS: molecular ion calcd for $C_6H_7O_2N_5$, m/e 197.0549; measured m/e 197.0571

| Anal. Calcd for $C_6H_7O_3N_5$: | C, 36.55; | H, 3.58; | N, 35.52 |
|---|---|---|---|
| Found: | C, 36.35; | H, 3.28; | N, 35.29 |
| | 36.29; | 3.53; | 35.22 |

EXAMPLE 3

Preparation of 3,5-Diamino-6-carbamoylpyrazine
R = H

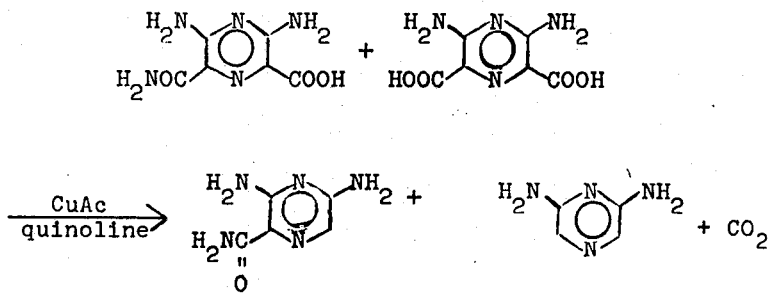

A slurry of 8.0 g of the material obtained from Example 1 was slurried in 70 ml of dry quinoline containing 0.10 g of cuprous acetate and heated at 170°C for 4 hours. During this time approximately the calculated amount of carbon dioxide was evolved as measured by a wet-test meter which had been previously saturated with carbon dioxide. After cooling, the slurry was filtered, washed with 2 N HCl and dried yielding 1.80 g of 3,5-diamino-6-carbamoylpyrazine.

EXAMPLE 4

Preparation of 3,5-diamino-6-carbamoylpyrazine

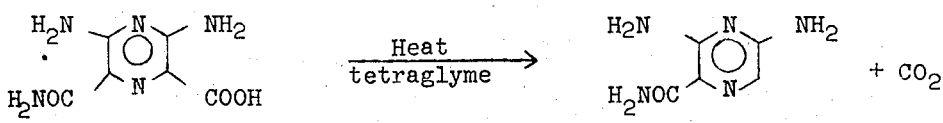

A slurry of 4.00 g (20.3 mmol) of 3,5-diamino-6-carbamoyl pyrazinoic acid in 40 ml of dry tetraglyme (tetraethyleneglycol dimethyl ether) was heated at 225°–240°C. for 6 hr during which time the reaction mixture became homgeneous. After cooling to room temperature a small amount (200 mg) of dark solid was filtered off and the filtrate was diluted with petroleum ether which induced the precipitation of 2.73 g (87.2%) 3,5-diamino-6-carbamoylpyrazine as a tan solid. Recrystallization of the entire sample from 100 ml of water with Darco activated carbon treatment gave 2.40 g of relatively pure product, a portion of which was recrystallized a second time from water giving the analytically pure material, mp 242° (decomp).

IR (KBr): $2.92\mu$, $3.02\mu$, $3.07\mu$, $3.15\mu$ (—$NH_2$); $5.92\mu$, $6.03\mu$, $6.38\mu$, $6.72\mu$, (X = O, $NH_2$, C=C and/or C=N)

$UV\lambda_{max}^{EtOH}$: 348 m$\mu$ ($\epsilon$ = 14,400); 269 m$\mu$ ($\epsilon$ = 14,700)

HRMS: molecular ion calcd for $C_5H_7ON_5$, m/e 153.0650; measured m/e 153.0654

NMR (DMSO-$d_6$): broad singlets, 8.5$\delta$ and 7.5$\delta$, 1 H each (amide $NH_2$, exchangeable with $D_2O$); broad singlets, 7.17$\delta$ and 6.52$\delta$, 2 H each (ring-$NH_2$, exchangeable with $D_2O$); singlet, 7.15$\delta$, 1H (ring hydrogen)

and treated with activated carbon (Darco). The filter cake was washed liberally with hot dimethylformamide and the clear yellow solution was diluted five times with water. After standing over night the solution had deposited fine, pale yellow needles which were filtered off and washed twice with acetone. After drying there was 2.22 g (90.5%) of pale yellow needles of 3,5-diamino-2,6-dicarbamoylpyrazine. The material darkens slightly at 378°, but remains crystalline to 430° (sealed tube). A strongly heated sample melted with evolution of ammonia.

IR (KBr): $2.92\mu$, $3.03\mu$, $6.37\mu$ (-$NH_2$); $6.04\mu$ (>C=O); $6.54\mu$ (sh) (C=C and/or C=N)

$UV\lambda_{max}^{EtOH}$: $362\mu$ ($\epsilon$ = 16,500); $281\mu$ ($\epsilon$ = 19,600); $222\mu$($\epsilon$ = 31,200)

HMRS: molecular ion, measured m/e 196.0710; calculated m/e 196.0709

Anal. Calcd. for $C_6H_8N_6O_2$:    C, 36.73;    H, 4.11;    N, 42.84
Found:    C, 36.66;    H, 3.98;    N, 42.53
   36.79;    3.98;    42.69

EXAMPLE A

Preparation of 3,5-Diaminopyrazinoic Acid

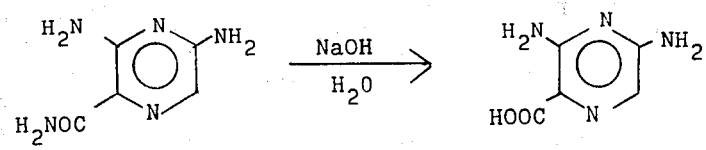

Anal. Calcd for $C_5H_7ON_5$:    C, 39.21;    H, 4.61;    N, 45.73
Found:    C, 39.39;    H, 4.71;    N, 45.41

EXAMPLE 5

3,5-Diamino-2,6-carbamoylpyrazine from sulfuric acid hydrolysis of 3,5-diamino-2,6-dicyanopyrazine

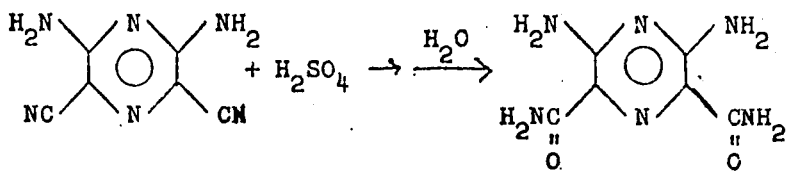

To 20 ml of concentrated sulfuric acid cooled to 0°–5°C was added portionwise with stirring, 2.0 g of 3,5-diamino 2,6-dicyanopyrazine. As the material went into solution a yellow color was generated which eventually changed to a dark green, then to a deep blue. After stirring for a total of 48 hours the deep blue reaction mixture was poured onto 400 g of ice. The green solid which formed was filtered off and washed several times with acetone, in which it is only slightly soluble. The olive green solid (2.35 g after drying) was dissolved in 400 ml. of refluxing dimethyl formamide A slurry consisting of 1.60 g of 3,5-diamino-6-carbamoylpyrazine, from Example 4, in 20 ml of 10% aqueous sodium hydroxide was heated at reflux for 2 hours, diluted to 100 ml with hot water and the resulting homogeneous solution was decolorized with Darco. Careful acidification to pH 1 gave a precipitate which was collected from the chilled solution by filtration. The collected material was washed twice, each time with small portions of water and methanol and dried yielding 0.92 g of 3,5-diaminopyrazinoic acid as a light powder, mp 169° (dec.).

IR(Nujol): $2.90\mu$, $3.00\mu$ (—$NH_2$); 3.5–$4\mu$ (broad, acid-OH); 5.9–$6.5\mu$ (multiple peaks, acid C=O, —$NH_2$); $7.9\mu$; $12.5\mu$ HMRS: molecularion calcd. for $C_5H_6N_4O_2$, m/e 154.0491; measured m/e, 154.053. Peak at m/e 110 (for M-$CO_2$)

This material can be converted in good yield to the known methyl 3,5-diaminopyrazinoate (U.S. Pat. No.

3,313,813, Example 2) by standard procedures. It in turn can be chlorinated by sulfuryl chloride to give methyl-6-chloro-3,5-diaminopyrazinoate.

3,5-Diamino-2,6-dicarboxypyrazine is available from basic hydrolysis of 3,5-diamino-2,6-dicyanopyrazine by the following reaction:

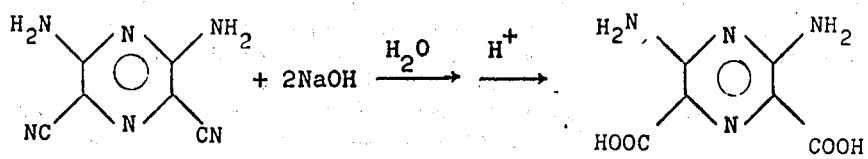

A slurry consisting of 5.00 g (3.13 × 10⁻² mol) of 3,5-diamino-2,6-dicyanopyrazine, in 100 ml of 5% sodium hydroxide (12.5 × 10⁻² mol) solution was heated at reflux for 6 days. The initial vigorous evolution of ammonia had ceased by the end of this time. The hot, slightly yellow slurry was diluted with 300 ml of hot water and all but a very small amount of material dissolved. After treatment with Darco and filtration, 25 ml of concentrated hydrochloric acid was added to the still warm and vigorously stirred solution. The resulting slurry was cooled in an ice bath and the diacid was collected by filtration, washed three times with water, two times with methanol and dried overnight at 100°C in a vacuum oven (4.70 g, 76%). The infrared spectrum of the material obtained in this manner is identical with that of material obtained by basic hydrolysis of 3,5-diamino-2,6-dicarbamoylpyrzine, as described below.

A mixture of 4.9 g (.025 mole) of 3,5-diamino-2,6-dicarbamoylpyrazine, 10 g (85%, 0.15 equiv.) of KOH pellets, and 160 ml of water was refluxed under $N_2$ for 6 days. After 4 hours it became a clear orange solution. After 6 days the heated solution was sparged with $N_2$ for several hours to remove ammonia. Cooling to 0°C precipitated the white potassium salt of the product. After isolation of only a small sample of this salt (0.26 g) the mixture was diluted with 100 ml of water, acidified with 25 ml of concentrated HCl, and filtered. The solid was recrystallized from 4 l. of water decolorizing with a little Darco to give 3.23 g (59.8%) white plates which turned light tan upon drying, 3,5-diaminopyrazine-2,6-dicarboxylic acid monohydrate, dec 240°C. It was necessary to heat the product at 111°C (0.1 mm) over $P_2O_5$ overnight to remove the water of hydration, dec. 230°-238°C.

3,5-Diamino-2,6-dicyanopyrazine used as the starting material in Examples 1 and 2 can be prepared as follows:

4.52 g of darker product which is only slightly less pure product.

Recrystallization from dimethylformamide yielded long, slightly yellow needles containing solvent of crystallization which was removed by heating at 100°C or higher at 20 mm Hg for several hours. This material began to darken to a red solid above 300°C and did not melt below 400°C.

IR (KBr): 2.89 μ, 2.97 μ, 3.07 μ, 3.14 μ, 5.98 μ, 6.10 μ (—$NH_2$); 4.48 μ (-C≡N); 6.48 μ (conjugated C=C and/or C=N).

UV $\lambda_{max.}^{EtOH}$: 354mμ (ε 16,500), 274mμ (ε 16,700), 222mμ (ε 33,600).

HRMS: molecular ion, measured m/e 160.0494; calcd. m/e 160.0497.

Anal. Calcd. for $C_6H_4N_6$:  C, 45.00;  H, 2.52;  N, 52.48.
Found:  C, 45.29;  H, 2.79;  N, 52.46.

B. A stream of dry ammonia was passed over a rapidly stirred solution of 20.0 g (0.111 mol) of tetracyanopyrazine in 475 ml of tetrahydrofuran for 0.75 hour. The exothermic reaction was maintained below 25°C by ice-bath cooling during the initial part of the addition. The reaction mixture was evaporated to dryness on a rotatory evaporator giving, after drying at 100°C in a vacuum oven, 18.1 g of grey powder which was relatively pure 3,5-diamino-2,6-dicyanopyrazine.

In addition to the two procedures set out above, 3,5-diamino-2,6-dicyanopyrazine can also be prepared by ammonia displacement of the 3-cyano- group in 5-amino-2,3,6-tricyanopyrazine (which is disclosed in commonly assigned patent application Ser. No. 54,617, filed in the name of Donald R. Hartter on July 13, 1970).

Tetracyanopyrazine can be prepared as follows: A solution of 152 g (0.800 mole) of p-toluenesulfonic acid monohydrate in 500 ml of tetrahydrofuran was added dropwise at room temperature to a stirred solution of 40 g (0.376 mole) of diiminosuccinonitrile in 600 ml of tetrahydrofuran (under nitrogen atmosphere; 1.5 hours). Stirring at 25°C was continued for 2 hours. The precipitated ammonium tosylate (e.g., p-toluene-

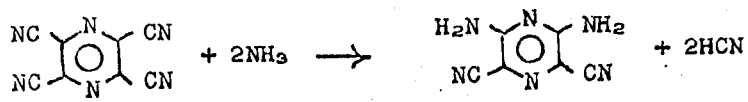

A. To a stirred pool of ca. 25 ml of liquid ammonia under nitrogen was added dropwise over a period of 0.5 hour a solution of 10.0 g (0.0556 mole) of tetracyanopyrazine in 75 ml of dry tetrahydrofuran. The solution turned deep red with the first drop. After the addition was complete, the deeply colored solution was stirred under a stream of nitrogen, filtered and washed with fresh tetrahydrofuran. This slightly grey material (4.42 g) is relatively pure 3,5-diamino-2,6-dicyanopyrazine. Evaporation of the filtrate yielded sulfonate) was then removed by filtering the solution under nitrogen. To the orange-colored filtrate containing oxalyl cyanide was added 20 g (0.185 mole) of powdered diaminomaleonitrile (15-minute addition) followed by stirring at 45°C for 3 days. The solution was filtered (removing additional ammonium tosylate) and preabsorbed on 150 g of silica gel (Mallinckrodt's Silic AR CC7) which was placed with petroleum ether on 200 g of fresh Silic CC7 in a 4-inch diameter column.

Elution in turn with benzene and chloroform yielded crude I and II, respectively. Two crystallizations of I from benzene yielded 8.47 g (25.4%) of pure tetracyanopyrazine as white leaflets melting at 274°–276°C.

Another process for preparing 3,5-diamino-6-carbamoylpyrazinoic acid consists of contacting either 3,5-diamino-2,6-dicyanopyrazine or 3,5-diamino-2,6-dicarbamoylpyrazine with at least an equimolar quantity of strong base such as the alkali metal hydroxides in an aqueous medium at a concentration of from 1 to 20 percent of the amino compound and 1 to 20 percent base at a temperature from ambient up to 170°C (pressure vessel required) for from 5 minutes up to 24 hours. Pressure is not a critical factor except in those cases where it is required where temperatures above the boiling point of the medium are used. Good results have been obtained using water, 4% sodium hydroxide, 7.5% substrate; 100°C (reflux); 15 hours.

A preferred process for preparing 3,5-diamino-6-carbamoylpyrazine consists in heating 3,5-diamino-6-carbamoylpyrazinoic acid at 120° to 250°C. neat or in an inert medium such as xylene, tetraglyme or quinoline, either in the presence or absence of a catalyst such as cuprous acetate. The pressure can be made very low to induce sublimation of the product or the pressure can be as high as desired. Concentration can range from 1 to 50 percent when an inert medium is used. The time can range from 5 minutes to 24 hours depending on the other conditions.

Good results have been obtained using a 10% slurry in quinoline containing 0.1% by weight cuprous acetate at 170°C. for 4 hours or a 10% slurry in tetraglyme at 225°–240°C. for 6 hours.

A further process for preparing 3,5-diaminopyrazinoic acid consists of hydrolysis of 3,5-diamino-6-carbamoylpyrazine by aqueous base or acid at temperatures from ambient to 150°C (pressure required) for 5 minutes to 10 hours. The base or acid concentration can range from 1 to 50% or higher and the concentration of the amino compound from 1 to 25%. Pressure is not critical.

Good results are obtained when using 10% amino compound in 10% aqueous alkali hydroxide at 100°C for 2 hours.

The novel compounds of this application which have two primary amine groups are useful as curing agents, e.g., mixture of epoxy resin Dow QX-3599 (Dow Chemical Co.) containing 15% of one of the diamines described above cures when heated at about 250°F for one hour. The diamines also react with diisocyanates to form polymers.

The embodiments of the invention in which an exclusive property or privilege is claimed are defined as follows:

1. A compound of the formula

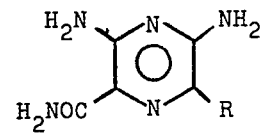

wherein
R is [—COOH, —CONH$_2$ or —H] —COOH or —CONH$_2$.

2. The compound of claim 1 where R = COOH; 3,5-diamino-6-carbamoylpyrazinoic acid.

3. The compound of claim 1 where R = CONH$_2$; 3,5-diamino-2,6-dicarbamoylpyrazine.

\* \* \* \* \*

UNITED STATES PATENT OFFICE
CERTIFICATE OF CORRECTION

PATENT NO. : 3,948,895
DATED : April 6, 1976
INVENTOR(S) : Dennis S. Donald

It is certified that error appears in the above-identified patent and that said Letters Patent are hereby corrected as shown below:

Column 6, line 67 "molecularion" should read --molecular ion--.

Column 10, line 32 "[-COOH, -CONH$_2$ or -H] should be deleted.

Signed and Sealed this

Twelfth Day of October 1976

[SEAL]

Attest:

RUTH C. MASON
Attesting Officer

C. MARSHALL DANN
Commissioner of Patents and Trademarks